Aug. 24, 1948.                 C. A. ELLIS                    2,447,936
                TRIAL FRAMES HAVING PIVOTED TEMPLE CONNECTIONS
                             Filed May 14, 1945
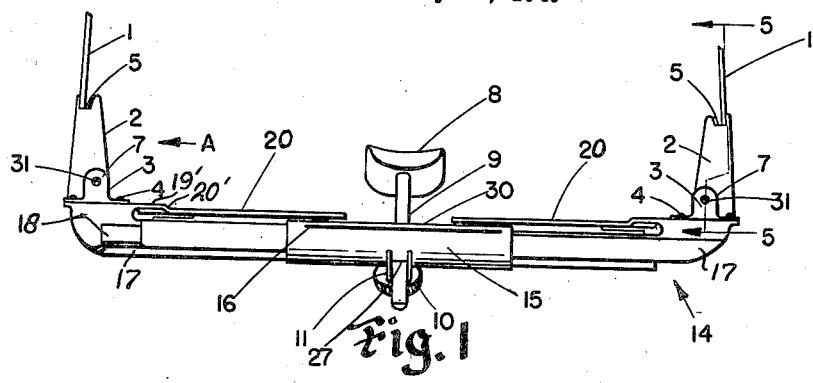
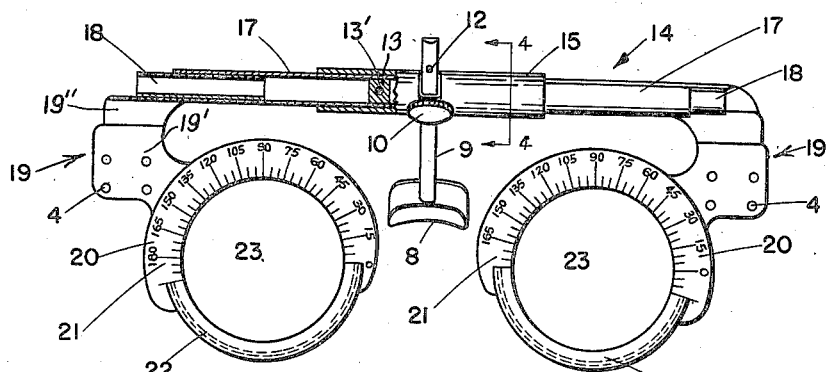
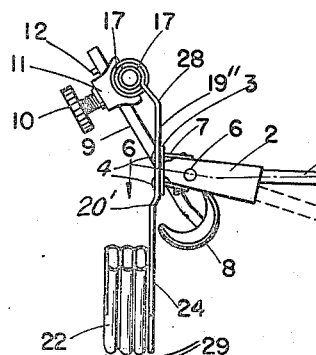
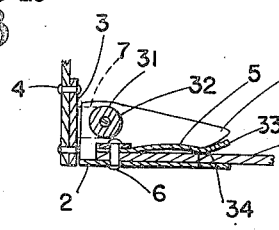
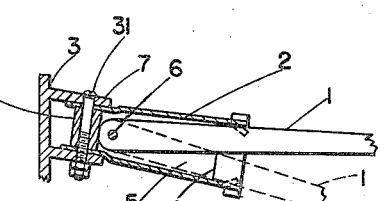
INVENTOR.
CHARLES A. ELLIS
BY
Louis L. Gagnon
ATTORNEY Patented Aug. 24, 1948

2,447,936

UNITED STATES PATENT OFFICE 2,447,936

TRIAL FRAME HAVING PIVOTED TEMPLE CONNECTIONS

Charles A. Ellis, Southbridge, Mass., assignor to American Optical Company, Southbridge, Mass., a voluntary association of Massachusetts Application May 14, 1945, Serial No. 593,596

4 Claims. (Cl. 88—20)

This invention relates to improvements in trial frames and has particular reference to a trial frame of simple and inexpensive construction and capable of adjustment to a patient's requirements with a minimum of effort.

One of the principal objects of the invention is to provide a trial frame of the above character having its major adjustable parts so arranged as to permit said parts to be readily adjusted to the facial requirements of different individuals and to be secured or retained in said adjusted positions by simple and efficient means.

Another object is to provide unitary means for securing the lens holding parts and for simultaneously securing the bridge member of a device of the above character in adjusted positions.

Another object is to provide a temple connection having pivotal means permitting said temples to be folded with respect to the lens holding means and having additional pivotal means permitting the lens holding means and temples to be tilted with respect to each other, in combination with resilient means for frictionally retaining said temples and lens holding means in adjusted relation.

Another object is to provide lens holding means having portions slidably related with each other for varying the distance between the lenses carried by said lens holding means in combination with means for adjustably supporting a nose engaging member and for simultaneously retaining said slidably related portions in adjusted positions, with said means having a portion introducing a resilient frictional binding relation between said parts.

Other objects and advantages of the invention will become apparent from the following description taken in connection with the accompanying drawings and it will be apparent that many changes may be made in the details of construction and arrangement of parts shown and described without departing from the spirit of the invention as expressed in the accompanying claims. I, therefore, do not wish to be limited to the exact details of construction and arrangement of parts shown and described as the preferred forms only have been given by way of illustration.

Referring to the drawings:

Fig. 1 is a top plan view of the device embodying the invention;

Fig. 2 is a front view of said device;

Fig. 3 is a fragmentary side elevational view of said device;

Fig. 4 is an enlarged sectional view taken on line 4—4 of Fig. 2;

Fig. 5 is a fragmentary slightly enlarged sectional view taken as on line 5—5 of Fig. 1;

Fig. 6 is a fragmentary sectional view taken as on line 6—6 of Fig. 3; and

Fig. 7 is a fragmentary view looking into the temple connection in the direction indicated by the arrow A.

The present invention is directed particularly to the provision of a trial frame of simple and inexpensive construction and one capable of adjustment to the requirements of different individuals with a minimum of time and effort and which will particularly overcome most of the prior art difficulties and discomforts to the individuals being fitted which have been encountered with most prior art complicated and expensive devices of this nature.

Referring more particularly to the drawings wherein like characters of reference designate like parts throughout the several views, the device embodying the invention comprises a longitudinal support 14 having a pair of trial lens holders 23 connected therewith by means of depending members 19. The longitudinal support 14 comprises two half sleeve members 17 whose longitudinal edges are adapted to slide on each other. Depending members 19 are preferably formed integral with each half sleeve 17. A tubular member 18 is affixed to each of the half sleeve-like members 17. The half sleeve-like members 17 overlap the tubular members 18 sufficiently to afford an inward adjustment of the half sleeve members 17 relative to each other and to permit an adjustment of the space between the lens holding members 23. The tubes 18 function as stop means for the inward movement of the half sleeve members 17 relative to each other. Each of the half sleeve members is provided with a stop member 13, as shown in Fig. 2, which functions to limit the outward longitudinal movement of said half sleeve members relative to each other. The stop members 13 preferably comprise solid tubular-like portions which are secured to a respective half sleeve by a screw 13' or other suitable means.

To retain the half sleeve members in assembled relation with each other, there is provided a rotatable sleeve 15 which surrounds both half sleeve members 17 and is positioned thereon intermediate depending members 19. The said sleeve 15 is provided with a housing 11 in which is slidably supported a bar member 9 to which is attached a nose pad 8. The sleeve 15 is provided with a notch 27 communicating with the housing 11 whereby the bar member 9 may engage the adjacent half sleeve member 17. The bar member 9 is held in adjusted position and functions in combination with the sleeve member 15 to hold the half sleeve members 17 in adjusted position through the forcing thereof into binding relation with said half sleeve members by a thumb screw or the like 10. The thumb screw 10 simultaneously functions to lock the bar member 9 in adjusted position. A pin or other protrusion 12 is provided adjacent the upper end of the bar 9 so as to prevent said bar from slipping outwardly of the housing 11 when the thumb screw 10 is loosened.

The sleeve 15 is provided with spaced slots 16 extending longitudinally thereof so as to provide a resilient section 30 which is initially set to extend inwardly of the tubular member so that it will function to resiliently retain the rotatable tube 15 and half sleeve members 17 in frictional engagement with each other when the thumb screw 10 is loosened.

From the above, it is quite apparent that in order to adjust the half sleeve members longitudinally relative to each other and to adjust the nose pad to proper position, all that is required is to loosen the thumb screw 10 an amount sufficient to permit said parts to be frictionally adjusted relative to each other with the rotatable function of the tube 15 affording means for adjusting the pad 8 rearwardly or forwardly. By merely tightening the thumb screw 10, the bar 9 will be locked in adjusted position and said locking will simultaneously cause the bar 9 to move inwardly of the notch 27 and function cooperatively with the sleeve 15 to lock the half sleeve members as well as the said sleeve in adjusted position.

The L-shaped depending members 19 are preferably formed integrally with the half sleeve members 17 and have legs 19' which terminate in integrally formed rings 20 to which arcuate pockets 22 are attached by soldering, welding or the like.

The portions forming the half sleeve members 17, the depending portions 19, and the rings 20 may be blanked from sheet metallic material by a single blanking operation. Right and left portions 19 may be formed by bending legs 19" of said portions forwardly, as shown at 28 in Fig. 3, and the parts forming the half sleeve portion may then be struck to form the curved cross-sectional shape desired, one of said parts being cupped forwardly and the other rearwardly so that when secured to the tubular members 18 and fitted in assembled relation with each other, the two half sleeve portions will meet to complete a full sleeve-like member.

The legs 19" are bent forwardly as illustrated at 28 so as to position the longitudinal support 14 clear of the patient's forehead and also to permit the lens holding members 23 to be placed at the proper distance from the eyes. Legs 19' are also bent forwardly adjacent ring 20 as illustrated at 20' to afford clearance for the heads of rivets 4.

The arcuate pockets 22 are each provided with spaced arcuate grooved portions, as shown at 29 in Fig. 3, to receive the trial lenses and to retain said trial lenses in proper spaced relation with each other. The requirement of this spaced relation is known in the art and is dependent, of course, upon the particular trial lenses used in performing the test. The trial lenses are computed for use at given distances from the eyes. The front of the ring members 20, preferably during the initial fabrication of said ring members, are provided with suitable scale or degree markings 21 whereby the position of the axis of the final prescriptive lens to be worn by the patient may be determined. This, of course, only applies when cylindrical lenses are required.

The depending portions 19 afford a suitable area to which temple hinge members 3 may be attached as by rivets, screws or the like 4. The hinge members 3, as shown in Figs. 1, 3, 5, 6, and 7, are provided with spaced ears 7 between which a housing 2 is pivotally connected by a pin, screw or the like 31. The housing 2, between the upper and lower walls thereof, is provided with a spacer tube 32 through which the pivot pin or screw 31 is extended. The said spacer tube 32 is for retaining the upper and lower walls of the housing in proper spaced relation. The said housing 2 has a temple bar 1 pivotally connected thereto as by a screw, pin or the like 6. The pivot member 6 also affords means for securing a blade spring or the like 5 in superimposed relation with the adjacent end of the temple bar 1. The blade spring 5 is slightly cupped intermediate its ends and is provided with an angularly disposed end portion 33 thereby forming a side bearing portion 34 for frictionally engaging the adjacent side surface of the temple bar 1. The blade spring 5, adjacent the opposite sides of the angularly disposed portion 33, is provided with outwardly projecting portions 35. The side portions of the housing 2 are each provided with an end portion 36 adapted to be deflected inwardly so as to overlie the outwardly extending portions 35 and thereby retain the blade spring 5 in frictional engagement with the side surface of the temple bar 1.

It will be seen that the temple bar 1 may be folded in adjacent relation with the longitudinal support 14 about the vertical pivots 31 and the said lens holding members 23 may be tilted with respect to the longitudinal axis of the temple bar 1 about the horizontally disposed pivots 6, the bearing surface 34 of the blade spring 5 functioning to retain the parts in adjusted position.

The function of the device is extremely simple. When it is desired to adjust the device to the facial requirements of an individual, all that is necessary is that the thumb screw 10 be loosened. Great care is, of course, exercised not to loosen the thumb screw by an amount sufficient to allow the parts to move freely relative to each other. The half sleeve members are moved outwardly or inwardly by an amount sufficient to position the center of the lens holding members 23 in alignment with the line of straight-ahead vision of the eyes. That is to obtain the proper interpupillary distance between the two eyes. The nose pad 8 is raised or lowered or moved inwardly or outwardly by an amount sufficient to position the lens receiving cells of the pocket portions 22 at the proper distance from the eyes. The upward or downward movement of the nose pad affords means for raising or lowering the lens cells while the inward and outward movement of said pad controls the distance of the cells from the eyes. After these preliminary adjustments have been completed, the parts are held in adjusted position by merely tightening the thumb screw as set forth above.

To position the lens cells at the proper angle with respect to the line of straight-ahead vision, all that is required is that the sides of the cells be grasped by the examiner and that the cells be tilted about the pivots 6 in the direction required. The friction of the springs 5 will readily permit tilting and will hold the parts in adjusted position.

It is to be understood that the temple bars are of the usual trial frame type. That is, that the said temples have ear engaging portions which may be adjusted rearwardly or forwardly to vary the length of temple according to the requirements of the particular individual.

From the foregoing description, it will be seen that simple, efficient and economical means have been provided for accomplishing all of the objects and advantages of the invention.

Having described my invention, I claim:

1. In a trial frame, the combination of a front for receiving trial lenses and means for supporting said front on the head of a wearer, said means comprising a housing member pivotally connected to the front for pivotal movement about a vertically disposed axis, a temple pivotally connected to the housing member for movement about a pivot disposed adjacent said axis and in substantially normal relation thereto, said temple having a surface portion in sliding engagement with an adjacent surface of the housing member, a resilient member overlying the opposed surface of the temple and extending in a direction longitudinally of the temple, said resilient member having one end portion secured adjacent the pivot, and having an angularly disposed portion spaced from said end portion for frictionally engaging in substantially line contact the adjacent surface portion of the temple, and the housing member having portions shaped to overlyingly engage portions of the resilient member and retain said angularly disposed portions of the resilient member in positive frictional line contact engagement with said adjacent surface portion of the temple.

2. In a trial frame, the combination of a front for receiving trial lenses and means for supporting said front on the head of the wearer, said means comprising a housing member pivotally connected to the front for pivotal movement about a vertically disposed axis, a temple pivotally connected to the housing member for movement about a pivot disposed adjacent said axis and in substantially normal relation thereto, said temple having a surface portion in sliding engagement with an adjacent surface of the housing member, and a blade spring-like member of resilient nature in overlying relationship with the opposed surface of the temple, said spring-like member having one end portion secured adjacent the pivot and having an angularly disposed portion adjacent its opposed end for frictionally engaging in substantially line contact the adjacent surface portion of the temple, said spring-like member being cupped outwardly from the surface of the temple intermediate said end portions, and the housing member having wall portions shaped to overlyingly engage and retain said angularly disposed portions of the spring-like member in positive frictional line contact engagement with said adjacent surface portion of the temple.

3. In a trial frame, the combination of a front for receiving trial lenses and means for supporting the front on the head of a wearer, said means comprising a housing member pivotally connected to the front for pivotal movement about a vertically disposed axis, a temple pivotally connected to the housing member for movement about a pivot disposed adjacent said axis and in substantially normal relation thereto, said temple having a surface portion in sliding engagement with the adjacent surface of the housing, a blade spring-like member of resilient nature overlying the opposed surface of the temple and having one end portion secured adjacent the pivot, said spring-like member extending in a direction longitudinally of the temple and having an angularly disposed portion adjacent its opposed end for frictionally engaging in substantially line contact the adjacent surface portion of the temple, and having outwardly projecting portions adjacent said angularly disposed portion, and the housing member having wall portions shaped to overlyingly engage said outwardly projecting portions so as to retain said angularly disposed portions of the spring-like member in positive frictional line contact engagement with said adjacent surface portion of the temple.

4. In a trial frame, the combination of a front for receiving trial lenses and means for supporting the front on the head of a wearer, said means comprising a housing member pivotally connected to the front for pivotal movement about a vertically disposed axis, a temple pivotally connected to the housing member for movement about a pivot disposed adjacent said axis and in substantially normal relation thereto, said temple having a surface portion in sliding engagement with the adjacent surface of the housing, a blade spring-like member of resilient nature overlying the opposed surface of the temple and having one end portion secured adjacent the pivot, said spring-like member extending in a direction longitudinally of the temple and having an angularly disposed portion spaced from said end portion for frictionally engaging in substantially line contact the adjacent surface portion of the temple, the intermediate portion of said spring-like member being cupped outwardly from the surface of the temple, and the housing member having normally disposed sidewall portions deflected inwardly toward each other so as to overlyingly engage adjacent portions of the spring-like member and retain said angularly disposed portions of the spring-like member in positive frictional line contact engagement with said adjacent surface portion of the temple.

CHARLES A. ELLIS.

REFERENCES CITED

The following references are of record in the file of this patent:

UNITED STATES PATENTS

| Number | Name | Date |
|---|---|---|
| 297,858 | Smith et al. | Apr. 29, 1884 |
| 1,550,582 | Sheard | Aug. 18, 1925 |
| 1,557,347 | Sheard | Apr. 13, 1925 |
| 2,333,738 | Peck et al. | Nov. 9, 1943 |
| 2,337,866 | Boughton et al. | Dec. 28, 1943 |
| 2,386,012 | Street | Oct. 2, 1945 |